(12) United States Patent
Leiner et al.

(10) Patent No.: US 11,397,592 B2
(45) Date of Patent: Jul. 26, 2022

(54) CONFIGURATION SYNTHESIS UTILIZING INFORMATION EXTRACTION FROM SERVICE ORIENTED ARCHITECTURES

(71) Applicant: TTTech Auto AG, Vienna (AT)

(72) Inventors: Bernhard Leiner, Vienna (AT); Salvador Rodriguez Lopez, Vienna (AT); Stefan Poledna, Klosterneuburg (AT); Georg Niedrist, Guntramsdorf (AT)

(73) Assignee: TTTECH AUTO AG, Vienna (AT)

( * ) Notice: Subject to any disclaimer, the term of this patent is extended or adjusted under 35 U.S.C. 154(b) by 128 days.

(21) Appl. No.: 17/069,556

(22) Filed: Oct. 13, 2020

(65) Prior Publication Data
US 2021/0132961 A1 May 6, 2021

(30) Foreign Application Priority Data
Nov. 6, 2019 (EP) .................................... 19207465

(51) Int. Cl.
*G06F 9/445* (2018.01)
*G06F 9/54* (2006.01)
(52) U.S. Cl.
CPC .......... *G06F 9/44505* (2013.01); *G06F 9/546* (2013.01)
(58) Field of Classification Search
CPC ............................ G06F 9/44505; G06G 9/546
USPC ........................................................ 713/100
See application file for complete search history.

(56) References Cited

U.S. PATENT DOCUMENTS

| 5,822,531 | A | * | 10/1998 | Gorczyca | .............. | G06F 9/5061 |
| | | | | | | 709/221 |
| 6,205,362 | B1 | * | 3/2001 | Eidson | ............... | G05B 19/0421 |
| | | | | | | 706/45 |
| 2008/0109568 | A1 | * | 5/2008 | Rengarajan | ........... | H04L 41/085 |
| | | | | | | 710/19 |

(Continued)

OTHER PUBLICATIONS

European Search Report for EP Application No. 19207465.6, dated Apr. 20, 2020. (10 pages).

*Primary Examiner* — Paul R. Myers
(74) *Attorney, Agent, or Firm* — Eversheds Sutherland (US) LLP

(57) ABSTRACT

A method to generate configuration data to enable and/or to enhance real-time communication in a cyber-physical system or in a cyber-physical system of systems. The system includes components connected to each other by a communication infrastructure. The components each execute at least one application, which applications exchange information with at least one application being executed on another component. The components are configured to send and/or receive said information according to configuration data: The first configuration data for two or more of the components, on each of which at least one application is executed, is generated by execution of a publish-subscribe protocol, which is executed by two or more of the components, for which the first configuration data are provided. The first configuration data is used as input to a process that produces second configuration data, wherein (i) first and second configuration data are not equal, and (ii) the two or more components, on each of which at least one application is executed, use said second configuration data as configuration data for their real-time communication.

20 Claims, 5 Drawing Sheets

(56) References Cited

U.S. PATENT DOCUMENTS

| | | | |
|---|---|---|---|
| 2008/0162107 A1* | 7/2008 | Aniszczyk | G06F 9/44505 |
| | | | 703/21 |
| 2009/0144211 A1* | 6/2009 | O'Sullivan | G06Q 50/01 |
| | | | 706/14 |
| 2009/0216990 A1* | 8/2009 | Vick | G06F 9/44505 |
| | | | 711/E12.002 |
| 2010/0057680 A1* | 3/2010 | Little | G06F 16/958 |
| | | | 707/E17.014 |
| 2010/0064244 A1* | 3/2010 | Kilpatrick, II | H04M 1/0243 |
| | | | 345/1.3 |
| 2013/0132582 A1 | 5/2013 | Kim et al. | |
| 2015/0039734 A1 | 2/2015 | King et al. | |
| 2019/0227814 A1* | 7/2019 | Bregman | G06F 8/60 |

\* cited by examiner

CONFIGURATION SYNTHESIS UTILIZING INFORMATION EXTRACTION FROM SERVICE ORIENTED ARCHITECTURES

CROSS-REFERENCE TO RELATED APPLICATIONS

This application claims priority to European Patent Application No. 19207465.6, filed Nov. 6, 2019, which is incorporated herein by reference.

FIELD OF THE INVENTION

The invention relates to a method to generate configuration data, in particular enhanced configuration data, to enable and/or to enhance real-time communication in a system, in particular in a system of computers, for example in a cyber-physical system or in a cyber-physical system of systems, wherein said system comprises components, in particular two or more components, wherein said components are connected to each other by means of a communication infrastructure, and wherein at least two of said components, in particular each of said components, each executes at least one application, wherein at least one application being executed on a component exchanges information with at least one application being executed on another component, and wherein the components are configured to send and/or receive said information according to configuration data.

Furthermore, the invention relates to an entity for the use in an above mentioned method to generate configuration data.

Finally, the invention relates to a system, in particular a system of computers, for example a cyber-physical system or a cyber-physical system of systems, wherein said system comprises components, in particular two or more components, wherein said components are connected to each other by means of a communication infrastructure, and wherein at least two of said components, in particular each of said components, each is configured to execute at least one application, wherein at least one application being executed on a component exchanges information with at least one application being executed on another component, and wherein the components are configured to send and/or receive said information according to configuration data.

BACKGROUND OF THE INVENTION

Cyber-physical systems, CPS, are systems in which one or several computers monitor and/or control a physical process. Examples of CPS are: automobiles, aircrafts, trains, industrial robots and production lines, duty vehicles, space crafts and so forth. As computers evolve more and more, so does the complexity of CPSes. Even cyber-physical systems of systems, CPSoS, are evolving, in which multiple CPS are coupled to each other to perform even more complex tasks. Examples of CPSoSes can be found in the Industrial Internet of Things (IoT) that connects a multitude of complex machineries to each other, swarms of airborne drones, platooning in ground vehicles, and many more. In these CPS and CPSoS the communication between individual computers and the communication of components within an individual computer as well as the communication of components within different computers, different computers potentially belonging to different CPSes in a CPSoS, becomes more and more a key element in the design of CPS and CPSoS. Said communication often has to satisfy various requirements, for example, low latency, high availability, high integrity, security, safety, and many more. Thus, the communication in CPSes and CPSoSes becomes a complex design challenge.

In more classical information technology (IT), paradigms to handle communication complexity have been developed as for example the publish-subscribe paradigm (PSP) that enables service-oriented architectures (SOA). According to the PSP, a middleware is installed in a system, which middleware dynamically establishes the communication between sending and receiving applications. Rather recently the PSP has also been introduced to CPSes and CPSoSes, as for example SOME/IP in the automotive domain or the Robot Operating System (ROS) in robotics. However, as PSP has its origin to address rather IT-like problems, it often does not address the timing aspects of communication adequately. As the timing of communication is of upmost importance in CPSes and CPSoSes, existing PSP solutions are insufficient, but may be used as a building block in the design of the communication in CPSes and CPSoSes. In particular, state-of-the-art PSP solutions cannot be used for critical control tasks with low and guaranteed transmission latencies.

SUMMARY OF THE INVENTION

It is an objective of the present invention to ease the complex design challenge of communication in CPSes and CPSoSes, in particular in CPSes and CPSoSes with requirements of low latency communication.

This object is achieved with a method mentioned above, wherein according to the invention
- first configuration data for two or a multitude of the components, on each of which at least one application is executed, is generated by an execution of a publish-subscribe protocol, wherein said publish-subscribe protocol is executed by two or more of the components, for which the first configuration data are provided, and wherein
- said first configuration data is used as input to a process that produces second configuration data, wherein first and second configuration data are not equal, and wherein
- said two or multitude of components, on each of which at least one application is executed, use said second configuration data as configuration data for their real-time communication.

Furthermore, the object is achieved with an entity, entity, in particular a device or a system, for the use in an above mentioned method, wherein said entity is configured to receive first configuration data, and wherein said entity is further configured to used said first configuration data input for a process, and wherein the entity is configured to executed said process, and wherein said process produces second configuration data, and wherein said first and second configuration data are not equal.

Said entity may be part of a system or connected to a system, such as for example a system of computers, for example a cyber-physical system or a cyber-physical system of systems, wherein said system may comprise components, and wherein said entity is configured to provide the second configuration data to the system, in particular to one or more components of the system.

Finally, the object is achieved with a system mentioned in the introduction, wherein according to the invention
- two or more of the components are configured to execute a publish-subscribe protocol, and wherein first configuration data for two or a multitude of the components of the system, for example for the components on each of which at least one application is executed, is generated by the execution of said publish-subscribe protocol, and wherein the system, for example the two or more components, which execute the publish-subscribe protocol, provides said first configuration data to a process, and wherein said first configuration data is used as input to said process that produces second configuration data, wherein first and second configuration data are not equal, and wherein said two or multitude of components, on each of which at least one application is executed, are configured to use said second configuration data as configuration data for their real-time communication.

Said system may comprise at least one entity as mentioned before and/or is connected to at least one such entity, and wherein said process is executed on one or more of said entities.

The invention uses PSP solutions as a building block in an overall communication architecture for CPSes and CPSoSes, in particular CPSes and CPSoSes with requirements of low latency communication.

Thus, the present invention eases the complex design challenge of communication in CPSes and CPSoSes.

The method according to the invention discloses using a PSP solution to establish first configuration data. Said first configuration data may comprise information such as which sender is to communicate with which receiver. The information may further comprise the amount of data to be communicated, and/or an update frequency of said communication (between sender and receiver), and/or a maximum allowed transmission latency of said communication, and/or a required security level of said communication and/or a required safety/availability/integrity level of said communication.

Said first configuration data may as well include configuration data for the communication infrastructure that physically connects the components to each other. Said first configuration data (and potentially of the communication infrastructure) is then used as input in a process that produces as an output second configuration data. Said second configuration data may contain also configuration data for the communication infrastructure as well. Said second configuration data may contain additional information on task scheduling, and/or message transmission scheduling, and/or message forwarding scheduling, and/or message reception scheduling.

Preferred embodiments of the invention, in particular of the method and the system according to the invention, are described in the following. The mentioned features may be realized alone or in any arbitrary combination:

Said first configuration data may include also configuration data of the communication infrastructure.

The first configuration data may comprise information about which sender is to communicate with which receiver.

The first configuration data may comprise at least one, preferably all, or a combination of at least two of the following information:

the amount of data to be communicated between senders and receivers, an update frequency of the communication between senders and receivers, a maximum allowed transmission latency of the communication between senders and receivers, a required security level of the communication between senders and receivers, a required safety/availability/integrity level of the communication between senders and receivers.

Said second configuration data may also include configuration data of the communication infrastructure.

Said two or multitude of components each may maintain local representations of time and said local representations of time are synchronized to each other such as to establish a synchronized time base.

Said second configuration data may include configuration entries that define points in time at which two or a multitude of components provide application data to the communication infrastructure and/or define points in time at which two or a multitude of components receive application data from the communication infrastructure and/or define points in time at which the communication infrastructure forwards application data between components and/or within the communication infrastructure itself. This may enable and/or improve real-time communication.

Said second configuration data may be produced by a remote entity or two or more remote entities, wherein a remote entity may be realized as a service executed in a cloud, and/or in a cyber-physical system's infrastructure, and/or in another vehicle, and/or in a development computer.

The publish-subscribe protocol may be executed during development time of the system and/or as part an update and/or maintenance process of the system.

BRIEF DESCRIPTION OF THE DRAWINGS

In the following, in order to further demonstrate the present invention, illustrative and non-restrictive embodiments are discussed, as shown in the drawings, which show.

DETAILED DESCRIPTION

Some of the many implementations of the invention are described next. If not stated otherwise, all details described in connection with a specific example are not only valid in connection with this example, but apply to the general scope of protection of the invention.

Figure 1:
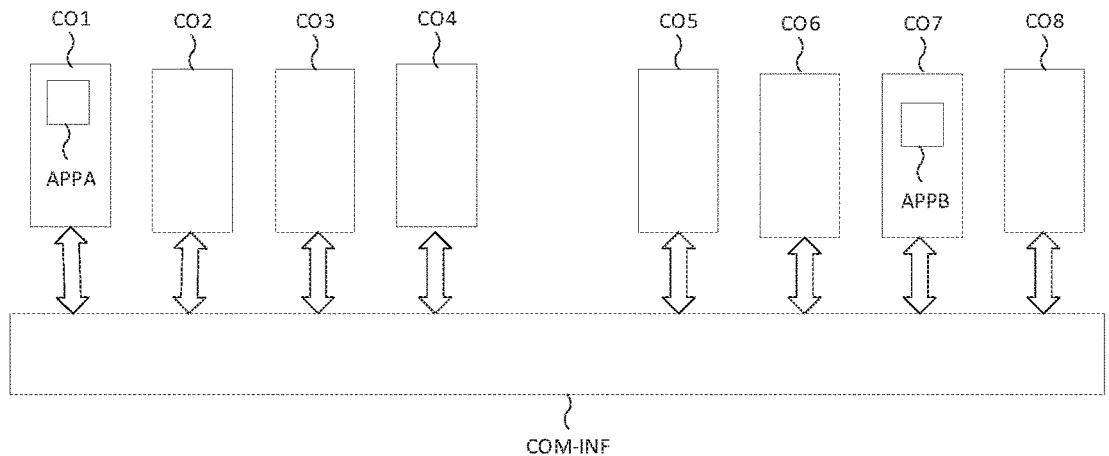
FIG. 1 an example of a cyber part of a cyber-physical system.

FIG. 1 depicts an example of a cyber part of a cyber-physical system, like a distributed computer system in a vehicle. In this example, the cyber part consists of eight components CO1-CO8 and a communication infrastructure COM-INF that connects the components to each other. The components CO1-CO8 execute applications, e.g., control applications, sensor acquisition, sensor fusion, trajectory planning, path planning, actuator control, etc. Preferably, each of said components executes at least one specific application. Each of the components CO1-CO8 may be realized in form of a core of a multi-core System-on-Chip (SoC), or as full SoCs, or as printed circuit boards (PCBs) with one, two, or a multitude of processors and/or SoCs, and/or as full electronic control units (ECUs) implementing one, two, or a multitude of PCBs.

In one example realization, each of the components CO1-CO8 is realized as a full multi-core SoC that are implemented on a PCB and connected to each other with PCIe (PCI express).

In another example realization each of the components CO1-CO8 is realized as a full ECU and the communication infrastructure COM-INF may be realized as an Ethernet network.

In another example, some components, e.g., components CO1-CO4 each are realized as a core of a first multi-core SoC, and the further components CO5-CO8 each may be realized as a core of a second single multicore SoC. The first group of components CO1-CO4 may be connected to each other with an on-chip network and the second group of components CO5-CO8 may be connected to each other with an on-chip network. Said first SoC and said second SoC may be implemented on a PCB and may be connected with each other with an off-chip network.

Figure 4:
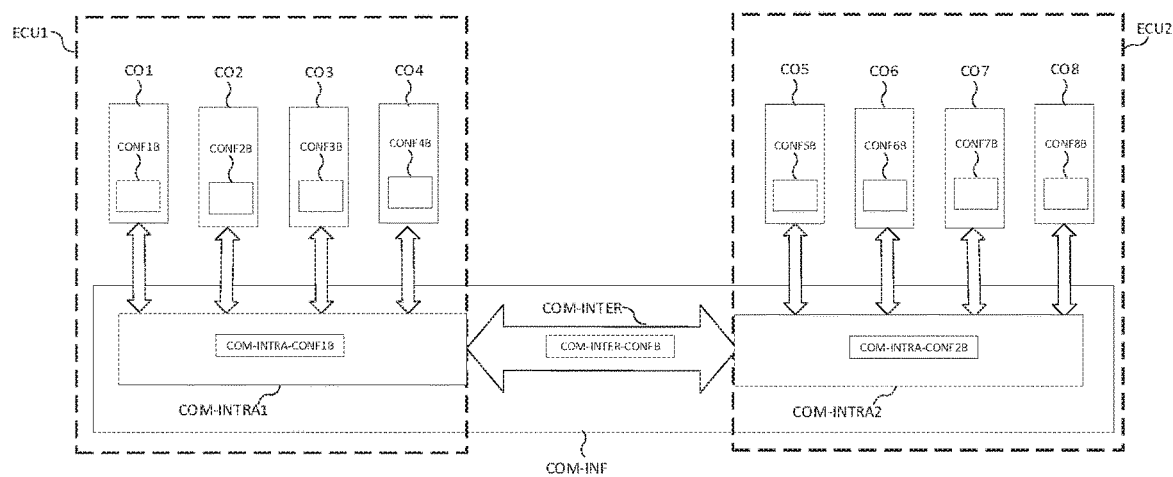
FIG. 4 a cyber-part of a cyber-physical system grouped in two individual electronic control units, FIG. 5 the cyber-part of a cyber-physical system of FIG. 4, connected with remote entities, FIG. 6 a flowchart that describes an example of an update and/or reconfiguration process of components of a system, and FIG. 7 a flowchart of an example realization of a process to combine first configuration data as used in the update and/or reconfiguration process FIG. 6.

FIG. 4 discusses a further example realization.

One, two, or a multitude of the components CO1-CO8 each may maintain local representations of time and said local representations of time are synchronized to each other such as to establish a synchronized time base.

Some of the components CO1-CO8 may be adapted to execute applications that need to exchange information with one or more applications being executed on other components. This information exchange requires some form of configuration of the senders, of the receivers of the information, and optionally also a configuration of the communication infrastructure COM-INF itself.

Figure 2:
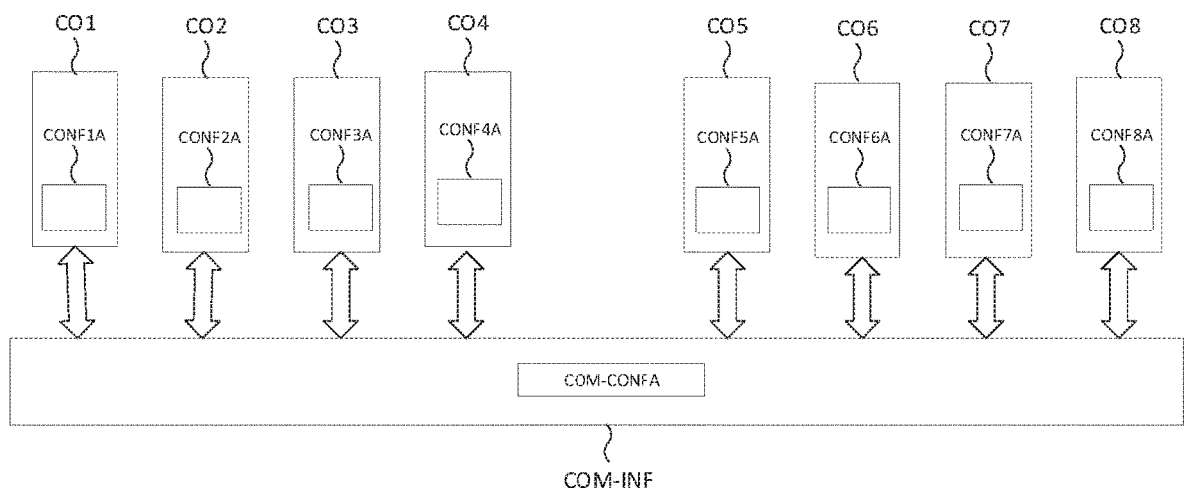
FIG. 2 the cyber part as described in FIG. 1 with first configuration data.

FIG. 2 depicts the cyber part as described in FIG. 1. Additionally, FIG. 2 highlights first configuration data CONF1A-CONF8A in the components CO1-CO8 and configuration data COM-CONFA in the communication infrastructure COM-INF. Said first configuration data CONF1A-CONF8A, COM-CONFA is established by execution of a publish-subscribe protocol PSP1.

Examples of publish-subscribe protocols PSP1 are the SOME/IP protocol, the robot operating system (ROS), the data distribution service (DDS), or OPC/UA PubSub.

Configuration data consists of or comprises one, two, or a multitude of configuration entries, "CONF-ENTRYA", "CONF-ENTRYB". Each configuration entry consists at least of a configuration entry name, "CONF-ENTRY-NAME" and a configuration entry value, "CONF-ENTRY-VALUE".

In one realization, each configuration entry may consist of a pair {CONF-ENTRY-NAME; CONF-ENTRY-VALUE}.

In another realization, a configuration entry may also comprise an additional configuration entry type, "CONF-ENTRY-TYPE". In such a realization, the configuration entry consists of the tuple {CONF-ENTRY-TYPE, CONF-ENTRY-NAME, CONF-ENTRY-VALUE}.

In another realization, the configuration entry consists of a tuple {CONF-ENTRY-TYPE, CONF-ENTRY-LENGTH, CONF-ENTRY-VALUE}, wherein "CONF-ENTRY-LENGTH" represents a configuration entry length, e.g., the size of the configuration entry as measured in bits (e.g., 8 bits).

The kind and number of configuration entries per configuration data may be defined at design time of the system.

The configuration entry name "CONF-ENTRY-NAME", configuration entry type, "CONF-ENTRY-TYPE", and configuration entry length, "CONF-ENTRY-LENGTH" of the configuration entries may be determined at design time of the system (e.g., the cyber-physical system or the cyber-physical system of systems) and updates/reconfiguration may only affect changes in the configuration entry value, "CONF-ENTRY-VALUE" of the configuration entries.

The execution of a publish-subscribe protocol PSP1 in components CO1-CO8 via the communication infrastructure COM-INF causes updates to the configuration entry values, "CONF-ENTRY-VALUE" of configuration entries, "CONF-ENTRY" of the respective configuration data in said components CO1-CO8 and/or in the communication infrastructure COM-INF.

For example, a typical functionality of a publish-subscribe protocol PSP1 is the determination of the addresses/identities of components CO1-CO8 that execute a specific application/service. For example, assuming a first application, "APPA" residing on component CO1 needs to receive information from a second application, "APPB", but the first application, APPA, initially has no knowledge on which component CO1-CO8 said second application, APPB, resides, and the communication infrastructure COM-INF initially is not aware of said first application APPA information needs (i.e., the need of the first application APPA to receive information from the second application APPB). In such a setting, executing a publish-subscribe protocol PSP1 may cause the following sequence of activities:

1) Said second application APPB announces its availability on a given component, say component CO7. The announcement may be realized by an announcement message or announcement messages sent to the communication infrastructure COM-INF.
2) The communication infrastructure COM-INF updates an existing configuration entry CONF-ENTRY {CONF-ENTRY-NAME, CONF-ENTRY-VALUE} of its configuration data COM-CONFA with configuration entry name CONF-ENTRY-NAME being *APPB-publisher-address* to {*APPB-publisher-address*, *CO7*}.
3) The communication infrastructure COM-INF forwards said announcement from said second application APPB to all components CO1-CO8, thereby forwarding said announcement also to said first application APPA residing on component CO1.
4) The first application APPA receives the announcement from said second application APPB.
5) The first application APPA updates an existing configuration entry {CONF-ENTRY-NAME, CONF-ENTRY-VALUE} of the configuration data CONF1A with configuration entry name CONF-ENTRY-NAME *APPB-publisher-address* to {*APPB-publisher-address*; *CO7*}.
6) Said first application APPA sends a subscription to the communication infrastructure COM-INF. The subscription may be realized by sending subscription messages to the communication infrastructure COM-INF.
7) Said communication infrastructure updates another existing configuration entry {CONF-ENTRY-NAME; CONF-ENTRY-VALUE} of its configuration data COM-CONFA with CONF-ENTRY-NAME being *APPB-subscriber-address* to {*APPB-subscriber-address*; *CO1*}.

8) The communication infrastructure COM-INF forwarding the subscription information to said second application APPB.
9) Said second application APPB updating a configuration entry {CONF-ENTRY-NAME; CONF-ENTRY-VALUE} of the configuration data CONF7A with CONF-ENTRY-NAME being *APPB-subscriber-address* to {*APPB-subscriber-address*; *CO1*}.

Thus after execution of the example publish-subscribe protocol PSP1, the different configuration data CONF1A, CONF7A and COM-CONFA comprise at least the following entries:

CONF1A: {*APPB-publisher-address*; *CO7*}
CONF7A: {*APPB-subscriber-address*; *CO1*}
COM-CONFA: {*APPB-publisher-address*; *CO7*}, {*APPB-subscriber-address*; *CO1*}

There are various ways how configuration entries can be utilized by the cyber-physical system. For example, the second application APPB may only start to send actual application data once at least one configuration entry exists with CONF-ENTRY-NAME *APPB-subscriber-address* and a CONF-ENTRY-VALUE assigned to a specific component in the system, e.g., to component *CO1* in the example above. This means that said second application APPB will only start to transmit application data once it is aware that there exists at least one subscriber, i.e., said application APPA, of its application data. The communication infrastructure COM-INF may utilize the entry {*APPB-subscriber-address*; *CO1*} in COM-CONFA to forward the application data provided by said second application APPB only to the component CO1 that hosts said first application APPA (and to no other component CO2-CO7). Component CO1 may accept an application message of APPB only, if the application message of APPB indicates that it has been sent by component CO7, thereby utilizing the configuration entry {*APPB-publisher-address*; *CO7*}.

Figure 3:
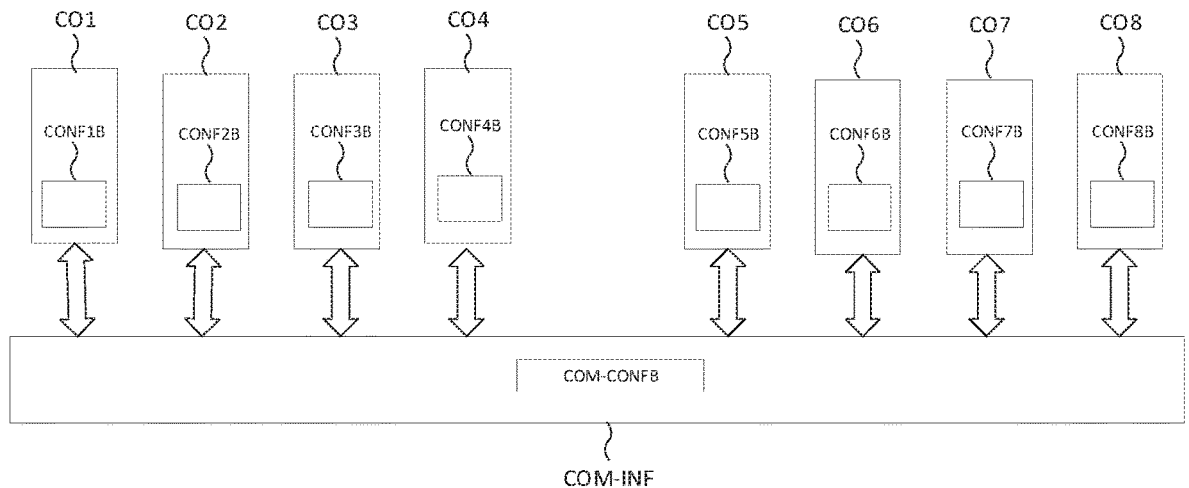
FIG. 3 the cyber part as described in FIG. 1 with second configuration data.

FIG. 3 depicts the cyber part as described in FIG. 1. Additionally, FIG. 3 depicts second configuration data CONF1B-CONF8B in components CO1-CO8 and COM-CONFB in the communication infrastructure COM-INF. Said second configuration data CONF1B-CONF8B and COM-CONFB differ from said first configuration data CONFA-CONF8A and COM-CONFA in any one of the following categories or in an arbitrary combination of any of the following categories:
said second configuration data has configuration entries that are not present in said first configuration data, and/or
said first configuration data has configuration entries that are not present in said second configuration data, and/or
said second configuration data has one, two, or a multitude of configuration entries that differ in their configuration entry value from said first configuration data.

Examples of configuration entries that may be part of said second configuration data and not being part of said first configuration data may refer to scheduled points in time, at which points in time an application APPB will send application messages to the communication infrastructure COM-INF. For example such a configuration entry as part of the configuration data CONF7B of component CO7 may be of the form: {CONF-ENTRY-NAME; CONF-ENTRY-VALUE} with the configuration entry name CONF-ENTRY-NAME being set to *APPB-MSG-TRANSMISSION-TIME* and the configuration entry value being set to *00:30*, resulting in {*APPB-MSG-TRANSMISSION-TIME*; *00:30*}, where *00:30* represents an example of a particular point in time according to the local clock of component CO7, which local clock may be synchronized with other, in particular all local clocks in other components CO1-CO6, CO8 and/or a local clock in the communication infrastructure.

Similar configuration entries for the configuration data CONF1B, COM-CONFB, may be present in the form {*APPB-MSG-RECEPTION-TIME*; *00:32*} and {*APPB-MSG-FORWARDING-TIME*; *00:31*} in component CO and the communication infrastructure, respectively.

Said second configuration data is produced by a process GENERATE-CONFB (see FIG. 7) that takes said first configuration data, or portions of said first configuration data, as input. This process is further discussed in the descriptions of FIG. 6 and FIG. 7.

FIG. 4 depicts the cyber-part of a cyber-physical system, like an automotive vehicle. In this example the components CO1-CO4 and CO5-CO8 are grouped in individual electronic control units ECU1 and ECU2. Within each electronic control unit ECU1, ECU2 the components CO1-CO4, CO5-CO8 exchange information by means of an intra-ECU communication infrastructure COM-INTRA1, COM-INTRA2, both maintaining configuration data COM-INTRA-CONF1B and COM-INTRA-CONF2B. The electronic control unites ECU1 and ECU2 are connected to each other by means of an inter-ECU communication infrastructure COM-INTER which maintains configuration data COM-INTER-CONFB. As depicted, in this case the communication infrastructure COM-INF consists of or comprises the intra-ECU communication infrastructures and the inter-ECU communication infrastructure. Consequently, the configuration data COM-CONFB of the communication infrastructure consists of or comprises the combination of the configuration data COM-INTRA-CONF1B, COM-INTRA-CONF2B, and COM-INTER-CONFB.

Figure 5:
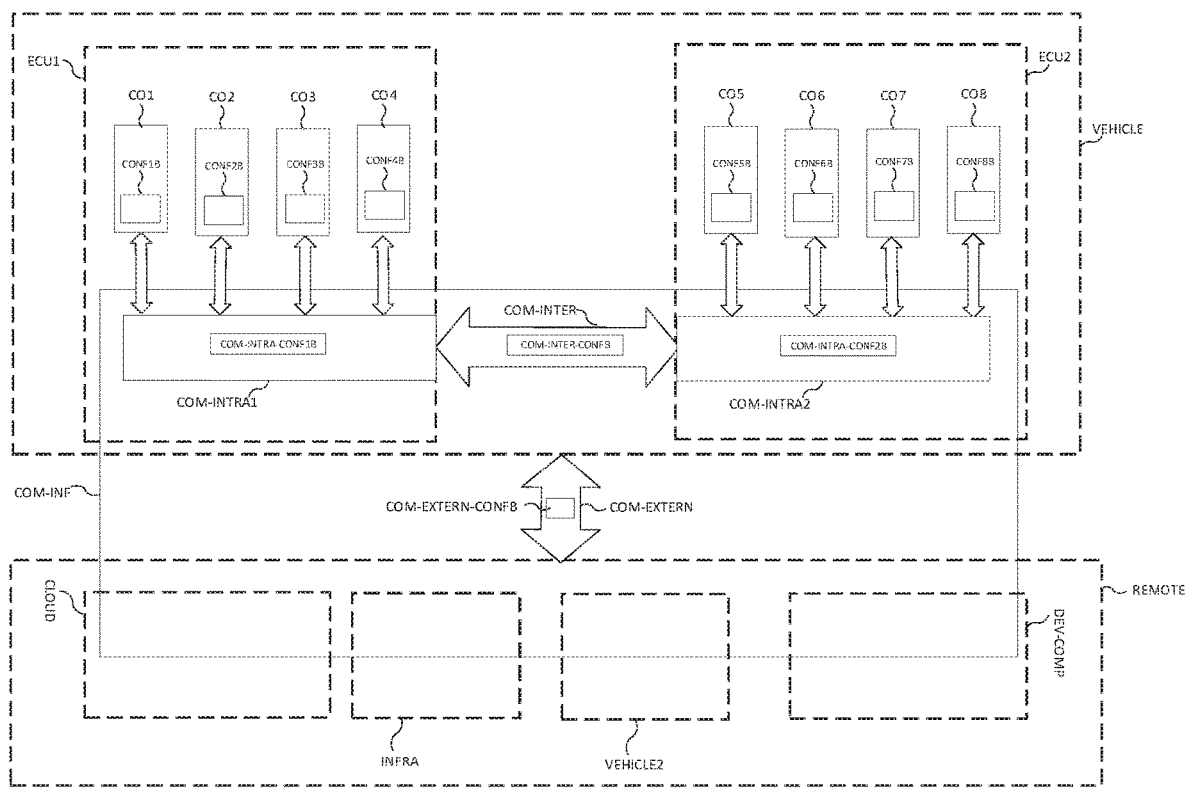

FIG. 5 depicts the cyber-part of a cyber-physical system, like an automotive vehicle VEHICLE. This example extends the example realization of FIG. 4 in that it also depicts remote entities REMOTE, like a remote data center executing a cloud service CLOUD, road infrastructure INFRA, another vehicle VEHICLE2, and a development computer DEV-COMP. Furthermore, the communication infrastructure COM-INF may be, as shown, extended with an external communication infrastructure COM-EXTERN that connects the VEHICLE to one, two, or a multitude said remote entities REMOTE. The external communication infrastructure may maintain external communication configuration data COM-EXTERN-CONFB, which is then also part of the overall communication configuration COM-CONFB.

Figure 6:
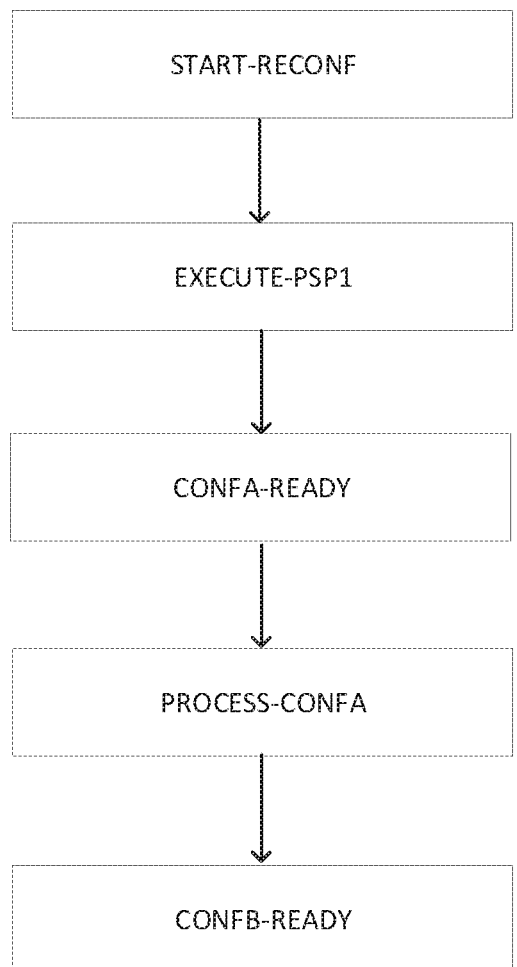

FIG. 6 depicts a flowchart that describes an example of an update and/or reconfiguration process of the components CO1-CO8 and/or the communication infrastructure COM-INF of the cyber-part of a cyber-physical system, such as an automobile.

Here, reference sign START-RECONF represents a trigger to modify first configuration data CONF1A-CONF8A, COM-CONFA such as to generate second configuration data CONF1B-CONF8B, COM-CONFB. Such a trigger is initiated by a person or a process. This trigger can be caused, for example, by a software engineer during the development time of the cyber-physical system, like during the development of the electronic system for an automobile, but may also be caused by an upgrade process while the cyber-physical system, like the automobile, is already operational, e.g., as a part of a maintenance procedure or as a part of an over-the-air update procedure. In both examples here there is a need to re-configure the cyber-physical system (either during initial development, or during maintenance, or upgrade). Thus, the trigger marks the event when this re-configuration is started.

Once, the START-RECONF trigger is initiated, a public-subscribe protocol PSP is executed EXECUTE-PSP1 such as to establish or update said first configuration CONFA-CONF8A, COM-CONFA. When PSP finishes the said first configuration CONF1A-CONF8A is present in the components CO1-CO8. This is depicted by CONFA-READY in FIG. 6.

A process PROCESS-CONFA combines said first configuration data of at least two components CO1-CO8 and/or at least one component CO1-CO8 and the communication infrastructure COM-INF to generate said second configuration data CONF1B-CONF8B, COM-CONFB.

Once said second configuration data is available, the configuration of components CO1-CO8 and/or COM-INF is updated, which is indicated by reference sign CONFB-READY.

Figure 7:
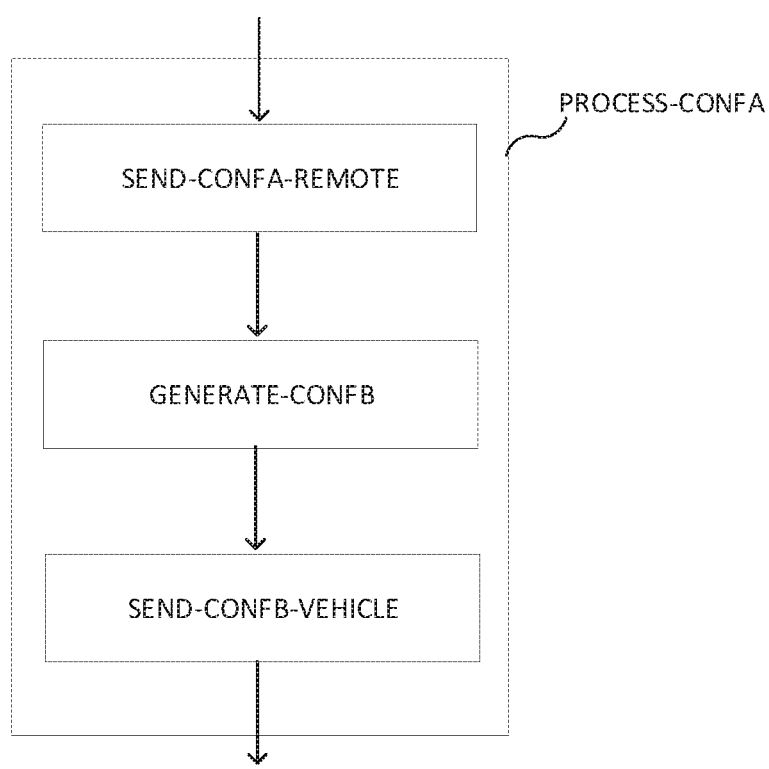

FIG. 7 depicts a flowchart of an example realization of the process PROCESS-CONFA process as shown in FIG. 6. In this example realization, the first configuration is sent (reference sign SEND-CONFA-REMOTE) to a remote entity REMOTE, for example to a cloud CLOUD, and/or a driving infrastructure INFRA, and/or to another vehicle VEHICLE2, and/or to a development computer DEV-COMP.

Next, said one or many remote entities will generate said second configuration data (reference sign GENERATE-CONFB). Said one or many remote entities will send said generated second configuration data back to the vehicle VEHICLE (reference sign SEND-CONFB-VEHICLE).

The invention claimed is:

1. A method to generate configuration data, in particular enhanced configuration data, to enable and/or to enhance real-time communication in a system, in particular in a system of computers, for example in a cyber-physical system or in a cyber-physical system of systems, the system comprising:
two or more components (CO1-CO8), which are connected to each other by a communication infrastructure (COM-INF), wherein at least two of said components (CO1-CO8), in particular each of said components, (CO1-CO8) each executes at least one application (APPA, APPB), wherein at least one application (APPA, APPB) being executed on one of the component (CO1-CO8) exchanges information with at least one application being executed on another of the component, and wherein the components (CO1-CO8) are configured to send and/or receive said information according to configuration data,
wherein:
first configuration data (CONF1A-CONF8A) for two or more of the components (CO1-CO8), on each of which at least one application is executed, is generated by an execution of a publish-subscribe protocol (PSP1), wherein said publish-subscribe protocol is executed by two or more of the components (CO1-CO8), for which the first configuration data are provided,
said first configuration data (CONF1A-CONF8A) is used as input to a process (PROCESS-CONFA) that produces second configuration data (CONF1B-CONF8B), first and second configuration data are not equal, and said two or multitude of components (CO1-CO8), on each of which at least one application is executed, use said second configuration data as configuration data for its real-time communication.

2. The method according to claim 1, wherein said first configuration data comprises configuration data (COM-CONFA) of the communication infrastructure (COM-INF).

3. The method according to claim 1, wherein the first configuration data comprises information about which sender is to communicate with which receiver.

4. The method according to claim 1, wherein the first configuration data comprises at least one of the following information:
(a) the amount of data to be communicated between senders and receivers,
(b) an update frequency of the communication between senders and receivers,
(c) a maximum allowed transmission latency of the communication between senders and receivers,
(d) a required security level of the communication between senders and receivers, and
(e) a required safety/availability/integrity level of the communication between senders and receivers.

5. The method according to claim 4, wherein the first configuration data comprises all, or a combination of at least two, of said information.

6. The method according to claim 1, wherein said second configuration data comprises configuration data (COM-CONFB) of the communication infrastructure (COM-INF).

7. The method according to claim 1, wherein said two or more of the components (CO1-CO8) each maintains local representations of time and said local representations of time are synchronized to each other such as to establish a synchronized time base.

8. The method according to claim 1, wherein said second configuration data (CONF1B-CONF8B, COM-CONFB) includes configuration entries (CONF-ENTRYB) that define points in time at which two or more of the components (CO1-CO8) provide application data to the communication infrastructure (COM-INF) and/or define points in time at which two or more of the components (CO1-CO8) receive application data from the communication infrastructure (COM-INF) and/or define points in time at which the communication infrastructure (COM-INF) forwards application data between components (CO1-CO8) and/or within the communication infrastructure (COM-INF) itself.

9. The method according to claim 1, wherein said second configuration data is produced by a remote entity (REMOTE) or two or more remote entities (REMOTE), wherein a remote entity (REMOTE) may be realized as a service executed in a cloud (CLOUD), and/or in a cyber-physical system's infrastructure (INFRA), and/or in another vehicle (VEHICLE2), and/or in a development computer (DEV-COMP).

10. The method according to claim 1, wherein the publish-subscribe protocol is executed during development time of the system and/or as part of an update and/or maintenance process of the system.

11. A device or system, for the use in a method according to claim 1, which is configured (i) to receive first configuration data (CONF1A-CONF8A), (ii) to use said first configuration data input for a process (PROCESS-CONFA), and (iii) to execute said process, wherein said process produces second configuration data (CONF1B-CONF8B), and said first and second configuration data are not equal.

12. The device or system according to claim 11, which is part of or connected to a system, such as for example a system of computers, for example a cyber-physical system or a cyber-physical system of systems, wherein said system may comprise components (CO1-CO8), and wherein said entity is configured to provide the second configuration data to the system, in particular to one or more components of the system.

13. A system of computers configured for executing a method according to claim 1, the system comprising:
two or more components (CO1-CO8) which are connected to each other by a communication infrastructure (COM-INF), wherein each of at least two of said components is configured to execute at least one application (APPA, APPB), wherein at least one application (APPA, APPB) being executed on a component (CO1-CO8) is configured to exchange information with at least one application being executed on another component, and wherein the components (CO1-CO8) are configured to send and/or receive said information according to configuration data,
wherein:
two or more of the components (CO1-CO8) are configured to execute a publish-subscribe protocol (PSP1),
first configuration data (CONF1A-CONF8A) for two or more of the components (CO1-CO8) of the system, for example for the components on each of which at least one application is executed, is generated by the execution of said publish-subscribe protocol (PSP1),
the system, for example the two or more components, which execute the publish-subscribe protocol (PSP1), provides said first configuration data to a process,
said first configuration data (CONF1A-CONF8A) is used as input to said process (PROCESS-CONFA) that produces second configuration data (CONF1B-CONF8B),
first and second configuration data are not equal, and
said two or multitude of components (CO1-CO8), on each of which at least one application is executed, are configured to use said second configuration data as configuration data for their real-time communication.

14. The system of computers according to claim 13, which is a cyber-physical system or a cyber-physical system of systems.

15. The system of computers according to claim 13, wherein said system comprises or is connected to at least one system, or device, configured (i) to receive first configuration data (CONF1A-CONF8A), (ii) to use said first configuration data input for a process (PROCESS-CONFA), and (iii) to execute said process, wherein said process produces second configuration data (CONF1B-CONF8B), and said first and second configuration data are not equal.

16. The system of computers according to claim 15, where the at least one system, or device, which is configured to generate said second configuration data, is a remote entity (REMOTE), which remote entity (REMOTE) is realized as a service executed in a cloud (CLOUD), and/or in the cyber-physical system's infrastructure (INFRA), and/or in another vehicle (VEHICLE2), and/or in a development computer (DEV-COMP).

17. The system of computers according to claim 13, wherein said first configuration data includes also configuration data (COM-CONFA) of the communication infrastructure (COM-INF).

18. The system of computers according to claim 17, wherein the first configuration data comprises information about which sender is to communicate with which receiver.

19. The system of computers according to claim 13, wherein the first configuration data comprises at least one of the following information:
(a) the amount of data to be communicated between senders and receivers,
(b) an update frequency of the communication between senders and receivers,
(c) a maximum allowed transmission latency of the communication between senders and receivers,
(d) a required security level of the communication between senders and receivers, and
(e) a required safety/availability/integrity level of the communication between senders and receivers,
wherein:
said second configuration data also includes configuration data (COM-CONFB) of the communication infrastructure (COM-INF),
said two or multitude of components (CO1-CO8) each maintain local representations of time and said local representations of time are synchronized to each other such as to establish a synchronized time base, and/or
said second configuration data (CONF1B-CONF8B, COM-CONFB) includes configuration entries (CONF-ENTRYB) that define points in time at which two or a multitude of components (CO1-CO8) provide application data to the communication infrastructure (COM-INF) and/or define points in time at which two or a multitude of components (CO1-CO8) receive application data from the communication infrastructure (COM-INF) and/or define points in time at which the communication infrastructure (COM-INF) forwards application data between components (CO1-CO8) and/or within the communication infrastructure (COM-INF) itself.

20. The system of computers according to claim 19, wherein the first configuration data comprises all, or a combination of at least two, of said information.

* * * * *